Figure 5:
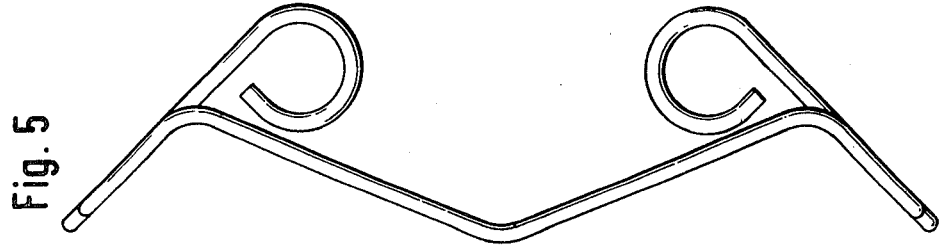

United States Patent [19]

Lindblad et al.

[11] 4,378,833
[45] Apr. 5, 1983

[54] ANTI-SKID DEVICE FOR VEHICLES

[76] Inventors: Lennart Lindblad, Hedasgatan 16, S-440 20 Vårgårda; Karl-Erik Lindblad, Annelundsvägen 22, S-441 00 Alingsås; Sven-Olof Lindblad, Köpmansgatan 60, S-441 00 Alingsås; Hans Lindblad, Hjälmared, S-441 00 Alingsås, all of Sweden

[21] Appl. No.: 198,103
[22] PCT Filed: Nov. 1, 1979
[86] PCT No.: PCT/SE79/00222
  § 371 Date: Jul. 3, 1980
  § 102(e) Date: Jul. 3, 1980
[87] PCT Pub. No.: WO80/00945
  PCT Pub. Date: May 15, 1980

[51] Int. Cl.³ .............................................. B60C 27/00
[52] U.S. Cl. .................................. 152/226; 152/225 C
[58] Field of Search ............... 152/225 R, 217, 225 C, 152/218, 219, 226, 221, 228; 24/68 R, 68 TT

[56] References Cited

U.S. PATENT DOCUMENTS

| | | | |
|---|---|---|---|
| 2,747,639 | 5/1956 | Mertz | 152/218 X |
| 3,856,069 | 12/1974 | Giannone | 152/225 R |
| 3,918,504 | 11/1975 | Prokesch | 152/225 C |
| 4,154,278 | 5/1979 | Casoni | 152/225 R |
| 4,155,391 | 5/1979 | Dieck | 152/225 C |

FOREIGN PATENT DOCUMENTS 2461991 7/1976 Fed. Rep. of Germany ... 152/225 R

*Primary Examiner*—William A. Powell
*Assistant Examiner*—Thomas Bokan

[57] ABSTRACT

An anti-skid device, which can be detachably mounted on the wheels of a vehicle, is simple to handle, comparatively independent of wheel dimensions, and which poses a minimum of risk of damage to the wheel housing of the vehicle and its brake system, at the same time as the device effectively follows the movements of the tire without risk of losing its hold.

An anti-skid device made according to the invention comprises a number of gripping elements (201) interspaced along the periphery of the wheel (6, 7) of the vehicle, and each having the shape of a frame open on one side and with two portions extending over the tread of the tire at a certain distance from each other, the frame having additional frame portions (204, 203), which extend along the plane sides of the wheel of the vehicle. The two gripping elements, which along the outside of the wheel have arms (204) extending in inwards direction are held together by means of suitable strapping means (208) which extend between arms extending in inwards direction between opposing gripping elements.

5 Claims, 11 Drawing Figures

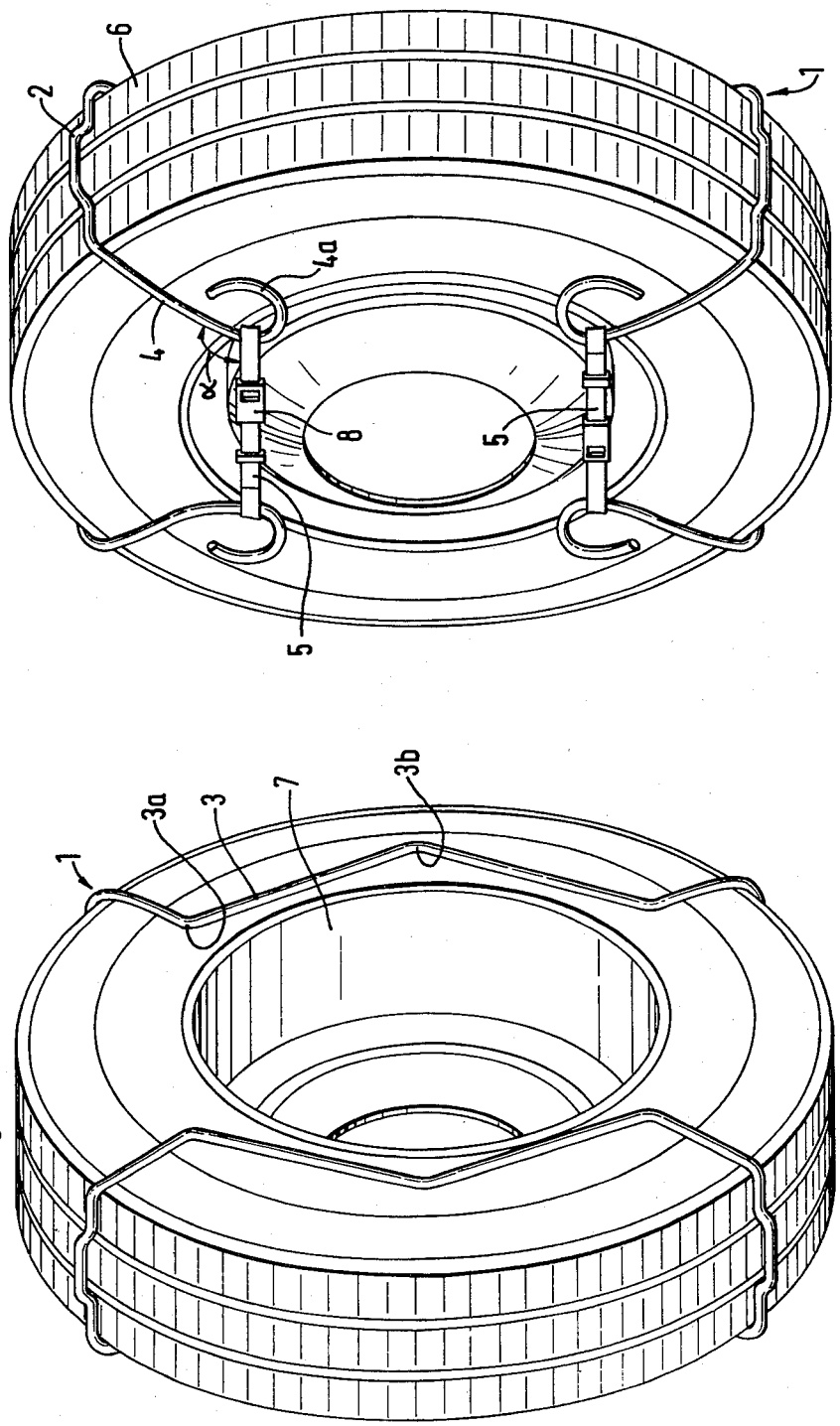

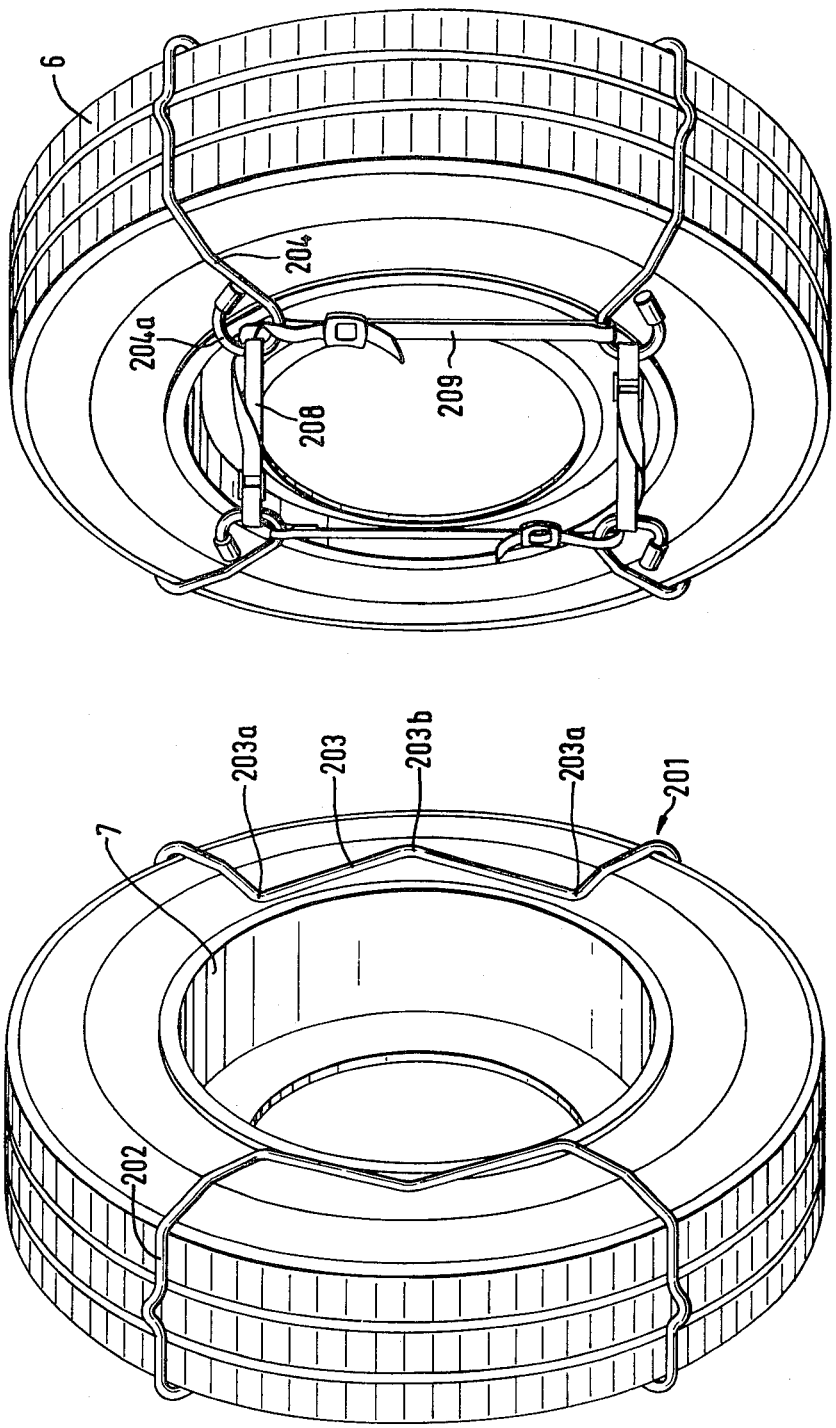

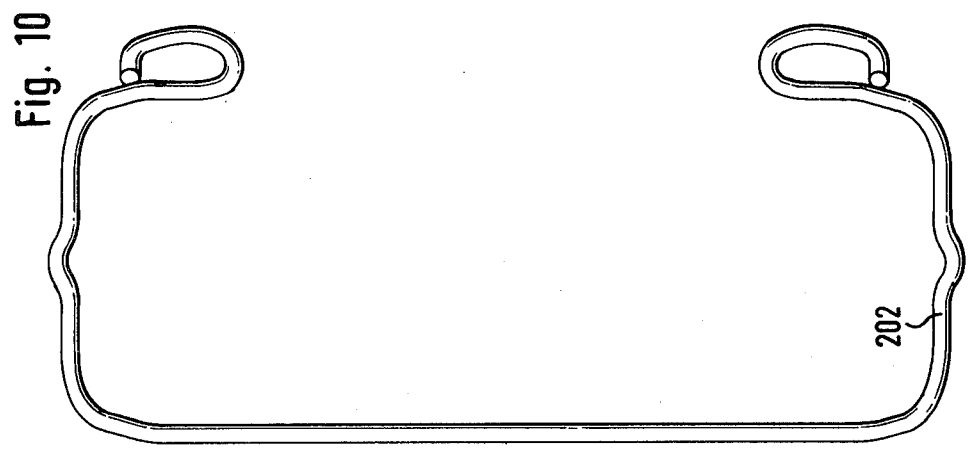

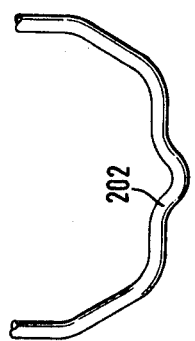
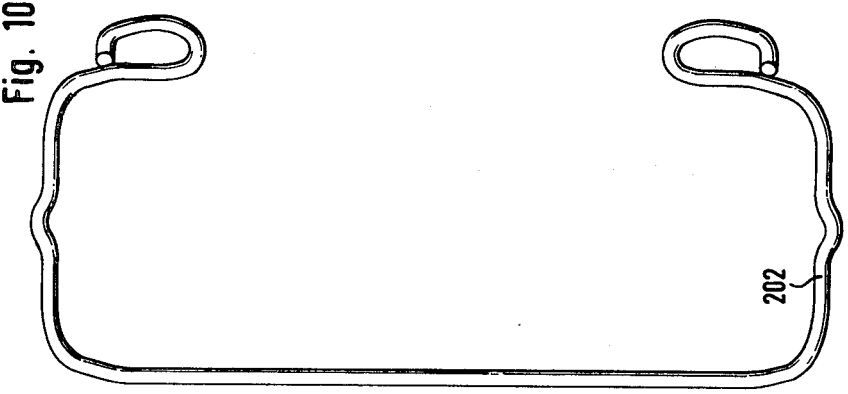
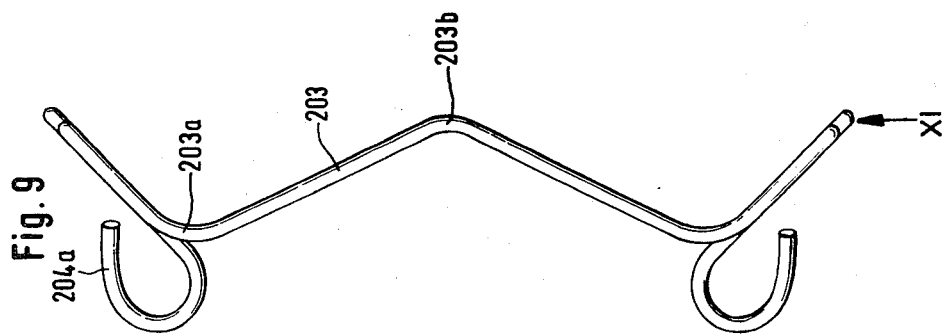

ANTI-SKID DEVICE FOR VEHICLES

The present invention relates to an anti-skid device for vehicles comprising a number of frame-shaped gripping elements in mounted condition distributed along the periphery of the wheel of the vehicle, each one having two gripping portions in opposite arrangement occupying positions at a certain distance from each other and spanning a portion of the wheel tread of the vehicle from one side of the wheel to its other side. Other likewise opposing frame portions connected with said gripping portions having an extension in a direction towards the center of the wheel on each side of the same; means for connecting together said gripping elements with each other on one side of the wheel of the vehicle being provided, so that the gripping portions of the gripping elements exercise a pressure force against the tread of the tire. The connecting means extend between portions of the frame of opposing gripping elements, which extend in inwards direction on the side of the wheel.

It is a principal object of the invention to provide an anti-skid device for vehicles, which is adaptable to vehicle wheels with dimensions varying within a comparatively wide range, and which is independent of the design of the rim, and further permits being fixed to the vehicle wheel by means of a simple operation, for example after getting stuck with spinning wheels, without any risk of damage to the wheel housing of the vehicle or to its brake system, and this at the same time as the device in an efficient manner follows the movements of the tire without any danger of loosing its grip on the wheel.

This object is reached by means of an anti-skid device according to the invention, which is essentially characterized by the frame being open on the outside of the wheel, frame portions being positioned on this side and connected with said gripping portions comprising arms extending along the side of the wheel, which arms in mounted condition by means of said connecting means are connected together with corresponding arms of another gripping element.

Figure 4:
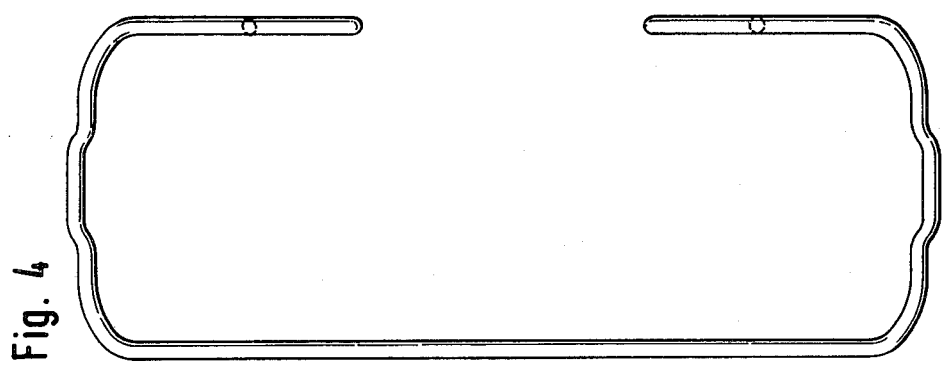
Figure 3:
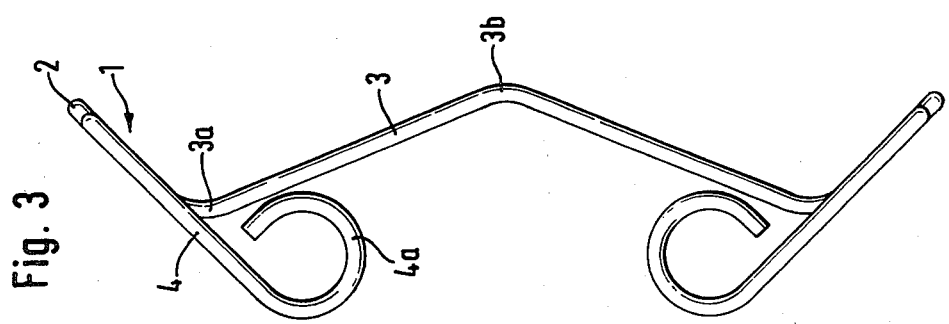
Figure 6:
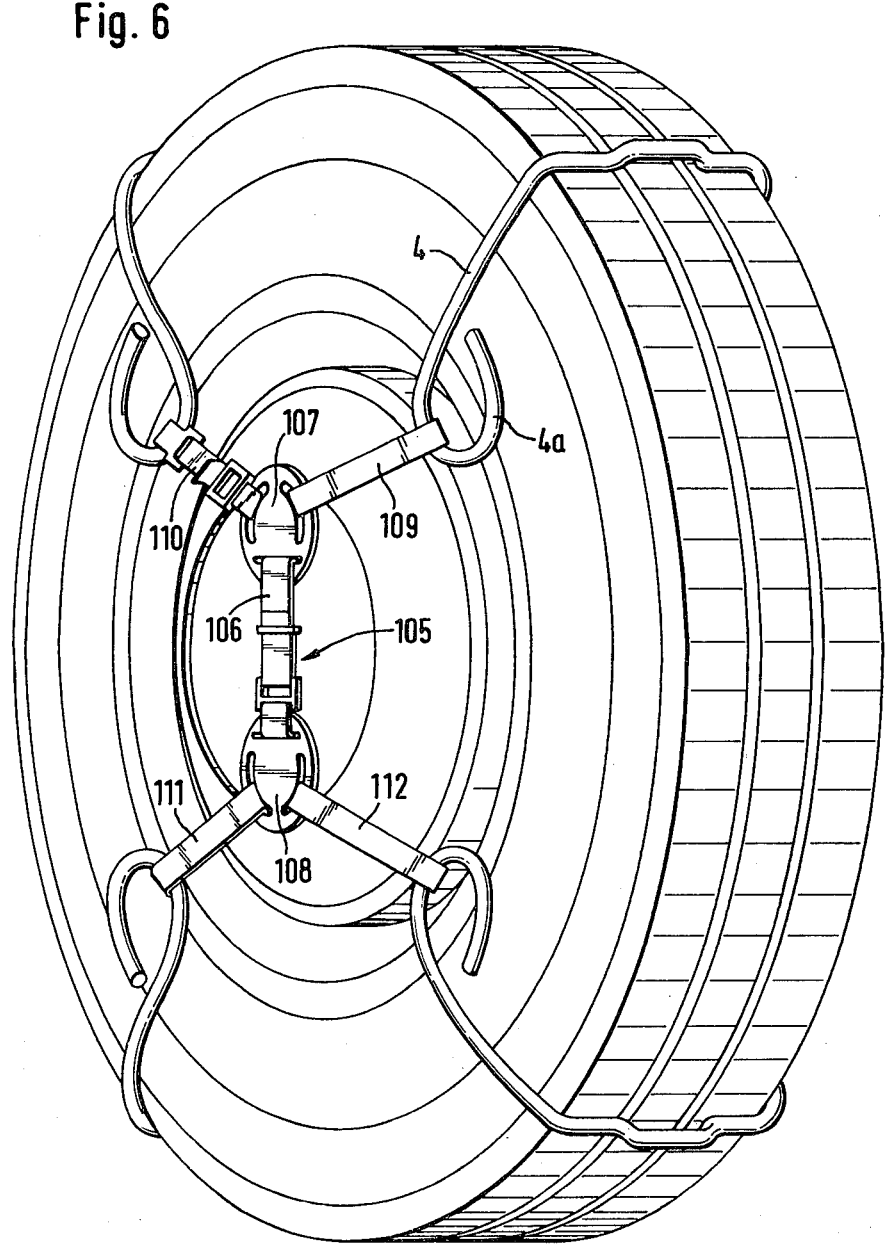

The invention will be described in the following, reference being made to the accompanying drawings, in which FIG. 1 is a perspective view taken from the inside of the wheel of a vehicle provided with an anti-skid device designed according to the invention;

FIG. 2 is a corresponding perspective view of the same anti-skid device but taken from the outside of the wheel of the vehicle, FIGS. 3–5 are three views of the anti-skid device in unassembled condition as seen from different sides, FIG. 6 is a perspective view corresponding to the one in FIG. 2 showing the anti-skid device provided with an alternative fastening means, FIGS. 7–8 are perspective views corresponding to the ones in FIGS. 1 and 2 and showing a wheel of a vehicle equipped with an anti-skid device according to a second embodiment of the invention, FIG. 9 is a side elevational view of a gripping shackle forming part of the anti-skid device shown in the FIGS. 7 and 8, FIG. 10 shows the same gripping shackle as seen from the right in FIG. 9, and FIG. 11 is a view of a portion of the gripping shackle as seen in the direction of the arrow XI in FIG. 9.

The anti-skid device illustrated in FIGS. 1–5 has two frame-shaped gripping elements in their entirety indicated with 1 and interconnected by means of straps 5. The frame formed by the gripping elements is open on the outside of the wheel. Each one of the gripping elements grips around the periphery of the tire by means of a hook-shaped portion having two gripping portions 2 located at a certain distance from each other and in transverse direction extending over the tread of the tire. Both of the gripping portions 2 are interconnected by means of a frame portion 3 located on the inside of the wheel of the vehicle and on the outside of said wheel of the vehicle each one of them continues in an arm 4 extending over the side of the wheel, the free end portion of said arm being bent into the shape of a loop 4a. In the embodiment shown the arms 4 essentially extend in radial direction relative to the wheel of the vehicle. Even though this direction has turned out to be very suitable, it does of course not mean a departure from the fundamental idea of the invention, if the arms 4 extend in a different direction. Straps 5 in pairwise arrangement extend between corresponding arms of the gripping elements. Because of the fact that, when the straps are tightened, the pulling direction of the straps forms an angle $\alpha$ relative to the direction of the arms 4 the gripping portions 2 will be effectively pressed against the tread of the tire 6, while making use of the resilient property of the material, which means that the gripping elements maintain a good hold on the wheel also when a change of the tire tread shape arises as a consequence of the driving. The gripping elements 1 are made of one single piece of a continuous wire of springing material, the connecting piece 3 located on the inside of the wheel from a point 3a close to the rim 7 of the wheel abreast of the gripping portions 2 passing over the tread of the tire extending to a point 3b located closer to the periphery of the tire, which point in the illustrated embodiment is in the area halfway between the gripping portions 2. The connecting piece 3 can of course in alternating manner extend in the radial direction of the wheel in a wavy or zigzag form. The portions of the gripping portion 2 lying against the tread of the tire have a slight curvature in order to provide a good grip on the tire. The straps 5 are provided with a strap lock 8, which can be of conventional type. The two straps can suitably be attached each one to the two gripping elements 1, which can be of identical design.

The mounting of the anti-skid device illustrated in FIGS. 1–5 takes place by forcing the gripping portions 2 over the wheel of the vehicle each one from diametrically opposed sides and connecting them by means of the straps 5. Because of the fact that the inner frame portions 3 extend in the direction towards the center of the wheel, their sliding over the wheel when in use is impeded. Even though the illustrated design with two gripping elements is a preferred embodiment, it is of course also within the scope of the invention to reduce the distance between the gripping portions 2 of the gripping elements and instead arrange several gripping elements interspaced along the periphery of the wheel of the vehicle. In that case the different gripping elements can be connected by means of a common connecting means such as a band, a wire or the like.

In the embodiment illustrated in FIG. 6 the gripping elements are held together by a common connecting element 105, which comprises a central strap 106, which can be tightened and extends between two disc-shaped coupling elements 107 and 108, from which straps 109, 110, 111 and 112 extend to the loops 4a of the gripping elements. In this device only one of the straps coupled together with gripping elements need to be provided with the adjusting means, viz. the strap 110. All of the straps 110–112 are suitably provided with hooks at their free ends in order to provide a detachable fastening of the connecting means to the gripping elements. The gripping elements shown in FIG. 2 as well as the ones shown in FIG. 6 have an identical form, and therefore corresponding parts have been given the same reference. As is best evident from FIG. 4 the gripping portions 2 of the gripping elements have a bulge located above the tread of the wheel in order to increase the capacity of the gripping portion to engage the ground. The form of the gripping elements is best evident from FIGS. 3 and 5, in which they are seen from opposite directions on the one side, which in mounted condition shall be positioned on the inside of the wheel of the vehicle.

The anti-skid device illustrated in FIGS. 7–11 differs from the anti-skid device illustrated in FIGS. 1–5 inasmuch as the loops 204a forming part of one and the same gripping element and to which the straps are attached, are made by bending the ends of the arms in a direction away from each other instead of towards each other, as was the case in the design according to FIGS. 1–5. The loops 204a are moreover somewhat bent in outwards direction away from the rim 7. Further, arms 204 forming part of one and the same gripping element are interconnected by means of additional straps 209. In this embodiment the gripping means are in their entirety indicated with 201. The connecting piece located on the backside of the wheel is indicated with 203, the points of the connecting piece located nearest to the rim of the wheel are indicated with 203a, and its point located nearest the periphery of the wheel is indicated with 203b. The gripping portions extending over the tread of the tire are furthermore indicated with 202. The straps extending between opposing gripping elements are indicated with 208.

The invention is not limited to the embodiments described above and illustrated in the drawings by way of example only, but can be varied as to its details within the scope of the following claims.

What is claimed is:

1. An anti-skid device for a wheel of a vehicle, comprising: at least two gripping elements, each gripping element being made from a continuous wire of resilient material and having two gripping portions which, when the anti-skid device is mounted on the wheel occupy positions spaced from each other circumferentially across the tread of the wheel, each gripping element also having two pairs of frame portions respectively connected to said gripping portions and when mounted on the wheel extending towards the center of the wheel on opposite sides thereof, each gripping element also having a connecting portion interconnecting the frame portions on one and the same side of the wheel while the frame portions on the other side of the wheel remain free and spaced apart from each other, and flexible strap means interconnecting all free frame portions, said flexible strap means including a central strap, and pairs of straps respectively connected to said central strap and extending therefrom to said free frame portions, whereby said free frame portions are free to move towards each other and towards the center of the wheel but are restrained from moving away from each other and radially outwardly from said center.

2. An anti-skid device according to claim 1, wherein said central strap is provided with locking means for adjusting the length of said central strap and fixing said length.

3. An anti-skid device according to claim 1 or 2, in which at least one of said straps is provided with a lock for adjusting and fixing the length of said strap.

4. An anti-skid device for a wheel of a vehicle, comprising: at least two gripping elements, each gripping element being made from a continuous wire of resilient material and having two gripping portions which, when the anti-skid device is mounted on the wheel occupy positions spaced from each other circumferentially across the tread of the wheel, each gripping element also having two pairs of frame portions respectively connected to said gripping portions and when mounted on the wheel extending towards the center of the wheel on opposite sides thereof, each gripping element also having a connecting portion interconnecting the frame portions on one and the same side of the wheel while the frame portions on the other side of the wheel remain free and spaced apart from each other, and flexible strap means interconnecting all free frame portions, said flexible strap means comprising individual straps extending between adjacent free frame portions, whereby said free frame portions are free to move towards each other and towards the center of the wheel but are restrained from moving away from each other and radially outwardly from said center.

5. An anti-skid device according to claim 4, wherein each of said straps is provided with locking means for adjusting and fixing the length of each said strap.

* * * * *